United States Patent [19]
Fish et al.

[11] 3,738,248
[45] June 12, 1973

[54] PHOTOGRAPHIC MODULE HAVING ACOUSTIC TRANSDUCER

[75] Inventors: James F. Fish, La Jolla; Bruce C. Parks, Imperial Beach, both of Calif.

[73] Assignee: The United States of America as represented by the Secretary of the Navy, Washington, D.C.

[22] Filed: Feb. 18, 1972

[21] Appl. No.: 227,540

[52] U.S. Cl.................... 95/86, 95/11 W, 95/44 R, 240/2 C
[51] Int. Cl. ............................................ G03b 15/05
[58] Field of Search................ 95/86, 11 W, 44 R; 240/26, 1.3, 2 C, 6.4 F; 52/637, 638; 285/156, 419

[56] References Cited
UNITED STATES PATENTS

| | | | |
|---|---|---|---|
| 2,331,736 | 10/1943 | Schwab............................ | 240/26 X |
| 2,996,967 | 8/1961 | Edgerton ........................ | 95/86 X |
| 1,295,776 | 2/1919 | McClelland..................... | 285/156 X |
| 525,459 | 9/1894 | Hill.................................. | 285/419 |
| 2,019,059 | 10/1935 | Sherman.................................. | 95/86 |
| 2,176,573 | 10/1939 | Hershberg...................... | 240/1.3 X |
| 2,904,257 | 9/1959 | Riekse .................................. | 240/26 |
| 3,324,239 | 6/1967 | Jacobson .......................... | 95/86 X |

FOREIGN PATENTS OR APPLICATIONS

| | | | |
|---|---|---|---|
| 708,920 | 4/1938 | Germany............................ | 95/11 W |

*Primary Examiner*—Samuel S. Matthews
*Assistant Examiner*—E. M. Bero
*Attorney*—Richard S. Sciascia, Ervin F. Johnston and Thomas G. Keough

[57] ABSTRACT

A framework supports and protects an underwater camera and several strobe lights for the nighttime taking of pictures of marine organisms. The framework-camera-and-light module is suspended from a surface vessel and readings are obtained from vertically and horizontally directed transducers to allow a precise positioning of the module. A hydrophone locates the sound making organisms and an additional transducer, carried adjacent to the camera, provides an indication of the distance from the camera to the organisms to permit placement of the camera for proper focusing. Because the transducers and hydrophone allow a precise positioning of the camera in darkness, the organism is photographed in the open and in a natural state when the strobe lights flash in synchronization with the camera shutter.

6 Claims, 4 Drawing Figures

PATENTED JUN 12 1973

PATENTED JUN 12 1973 3,738,248

PHOTOGRAPHIC MODULE HAVING ACOUSTIC TRANSDUCER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Routinely, underwater photographic missions are undertaken by divers equipped with cameras in watertight housings. Since light is rapidly attenuated with increasing depth, flash guns or strobe lights are synchronized with the camera shutter to provide the necessary illumination. As greatly increasing depths are encountered or as darkness approaches, a diver cannot carry enough batteries and lamps to properly illuminate distant objects. Submersibles have been used at depths and at night and usually their storage bank of batteries provides for adequate lighting. However, the cost of operating a submersible for taking a simple underwater picture is often prohibitive and, because of the submersible's bulk, its deployment around submerged obstacles or in dangerous currents is hazardous and unwise. Another limitation of all divers and most submersibles is their collective inability to maneuver through the ocean in darkness without flood lights to guide their way. Certain scientific observations are precluded using flood lights since most nocturnal marine organisms have ample time to scurry away or hide themselves upon sensing the approaching flood lights. When photos are to be taken of sound producing marine organisms, divers have had to rely on their hearing to locate the organisms. Because human hearing is poor in water, many of the sound sources warranting further investigation cannot be heard and are bypassed. A continuing need exists for a system for locating the organisms, for determining the focal distance to them and for taking their picture remotely to removed divers from the dangers attendant night diving operations.

SUMMARY OF THE INVENTION

An underwater photographic module suspended from the surface includes several acoustic transducers arranged to give representations of the spatial disposition of the module and a camera with respect to an object to be photographed. After the camera is focused, strobe lights providing a high intensity flash are synchronized with the camera shutter to ensure a wide-angle, focused picture.

A prime object of the invention is to provide a photographic module remotely deployed from a supporting vessel.

Another object is to provide a module having acoustic transducers and sensors to allow a responsive positioning at a correct focal distance from a camera to an object.

Still another object is to provide a photographic module provided with several high-intensity flash lamps for intermittently illuminating an object.

Yet another object is to provide an underwater photographic module having the capability for acoustically locating sound-producing organisms and photographing them unbeknownst to the organism.

These and other objects of the invention will become more readily apparent from the ensuing specification when taken with the drawings.

DESCRIPTION OF THE PREFERRED EMBODIMENT

Figure 1:
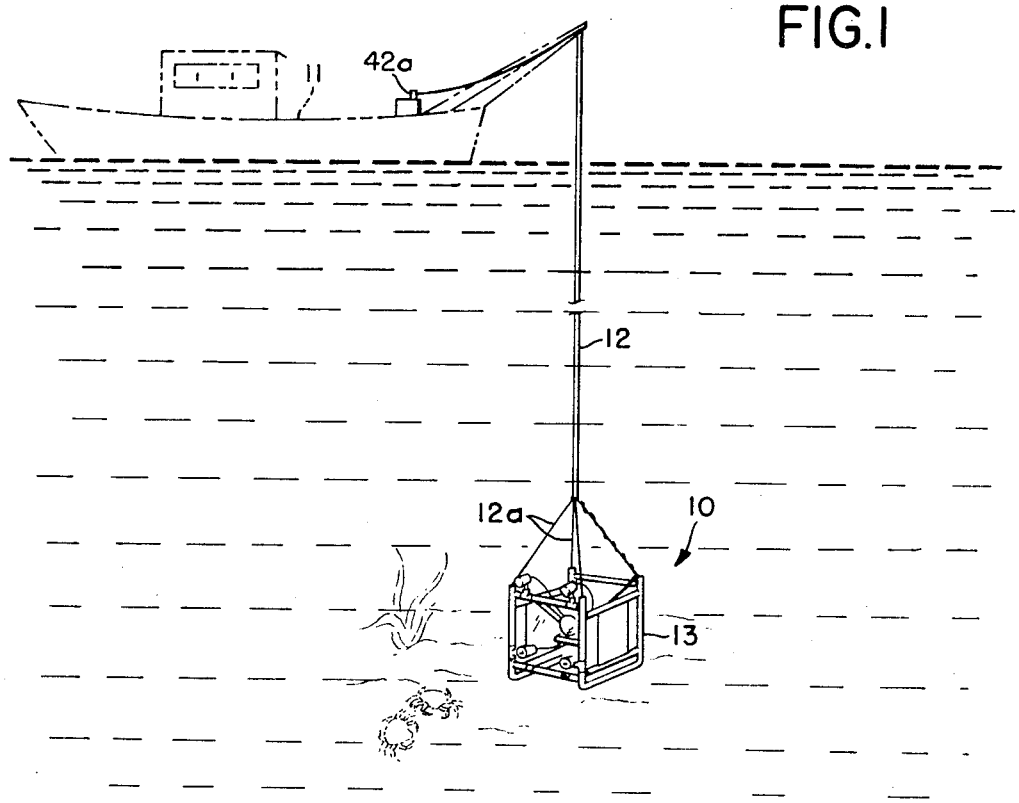
FIG. 1 is an isometric depiction of the invention operationally deployed.

Referring now to the drawings, an underwater photographic module 10 is suspended from a supporting vessel 11 by a cable 12. The cable serves the dual purpose of being the supporting member and also includes control conductors reaching to a monitoring unit 11a for transferring data between the vessel and the module. The supporting cable diverges into four strands 12a, each of which are attached at the upper corners of an essentially cubed-shaped framework 13.

Figure 3:
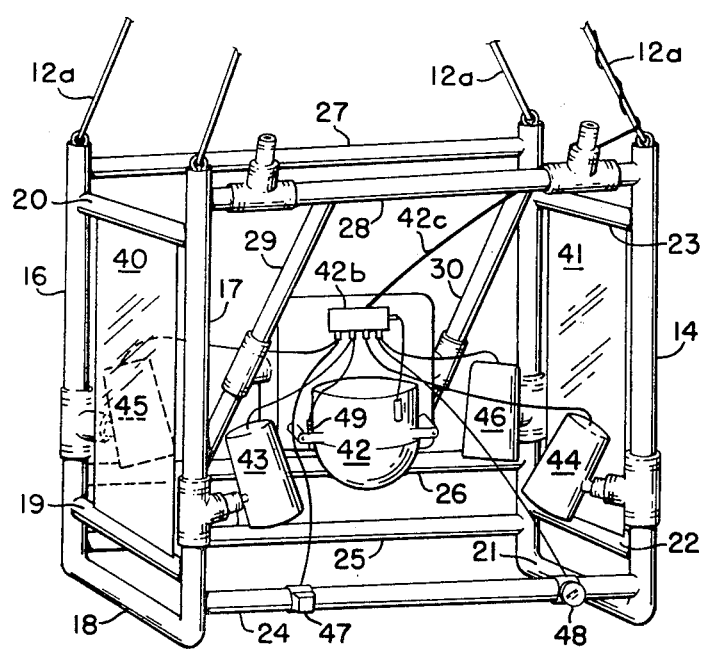
FIG. 3 is an isometric frontal view of the invention arranged for downward photography.
Figure 2:
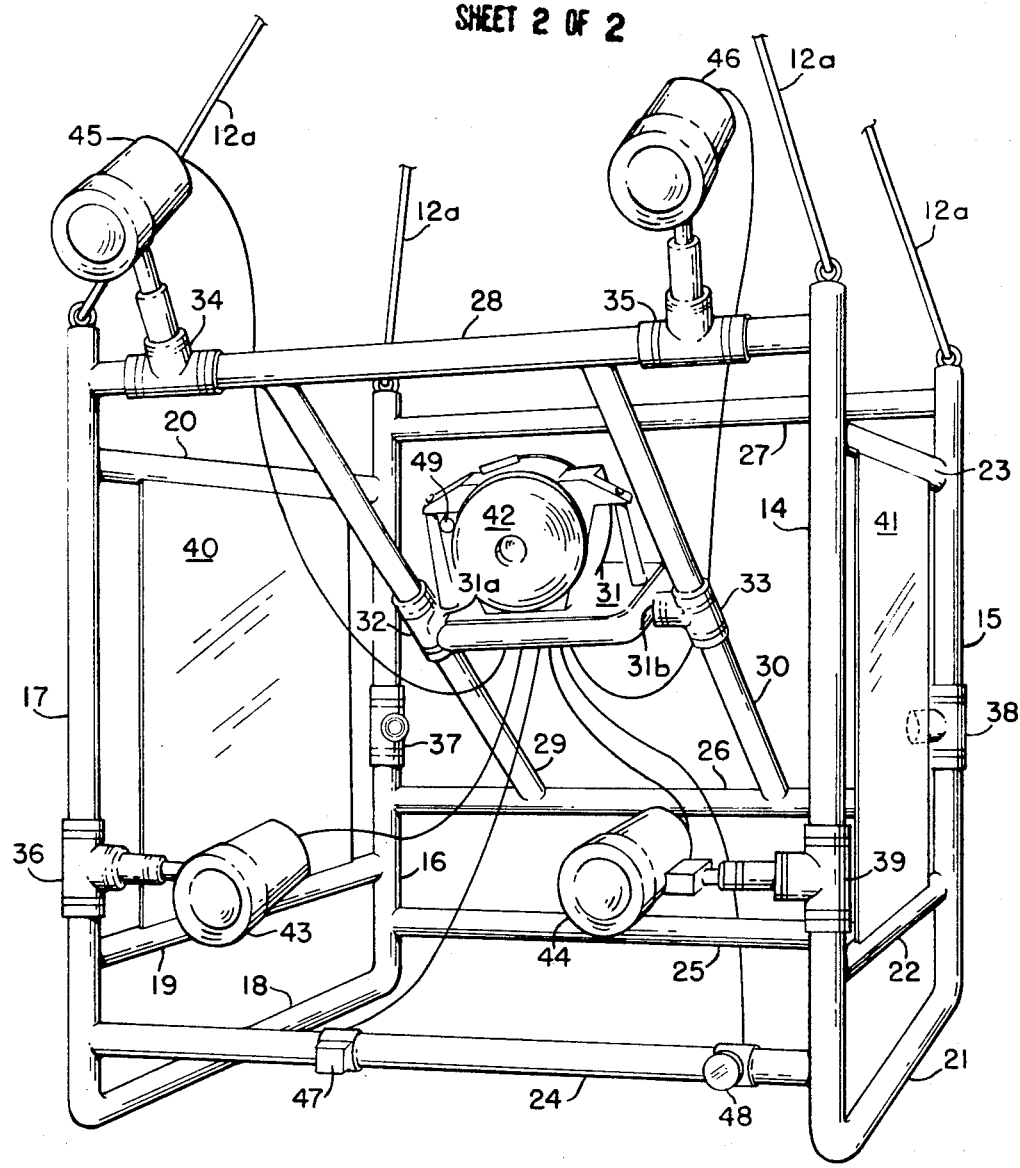
FIG. 2 is a perspective frontal view of the invention arranged for forward photography.

The main structural elements of the framework, see FIGS. 2 and 3, are vertical members 14, 15, 16 and 17 and six horizontal members 18, 19, 20, 21, 22 and 23 cooperating to define a pair of side skeleton panels joined together by cross-members 24, 25, 26, 27 and 28. Complete functional and structural integrity within the framework calls for the addition of a pair of diagonal members 29 and 30 secured at opposite ends to cross members 26 and 28.

Figure 4:
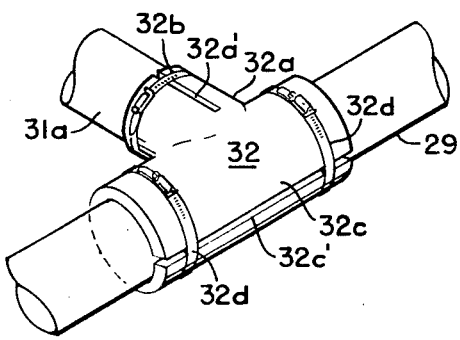
FIG. 4 is an isometric view of a T-shaped connector element.

These last two identified members, the diagonal members, define an inclined releasable mounting surface for a selectively positionable combination camera-and-control-platform 31. At opposite lateral extremes of this platform, tubular extensions 31a or 31b fit within the stem portions of a T-shaped connector element 32 or 33 respectively. Turning now to FIG. 4, details of the configuration of connector element 32 is shown, it being understood that the other T-shaped connector elements 34, 35, 36, 37, 38 and 39 to be elaborated on infra are similarly shaped and employed to selectively locate and orient other devices.

A stem portion 32a is provided with a cut or stem slot 32a' reaching from its opening along its length. circumferentially disposed about the stem portion a stem clamp 32b encircles and functions to close the slot as the clamp is tightened. In a preferred form the clamp is a commercially available stainless steel strap having a threaded male element on one end and a mating female element on its opposite end. Rotating the male element in contact with the female element opens and closes the clamp. The opening or closing action of the clamp which opens or closes the slot, allows the frictional gripping and retention of, for example, tubular extension 31a within the stem portion. A cross-portion 32c has a bore slightly in excess of the diameter of cross-member 29 and a cross-portion slot 32c' runs the length of the cross-portion. A pair of cross-portion clamps 32d mounted at opposite ends of the cross-portion function in a manner identical to that disclosed regarding the stem clamp and when tightened, secure connector element 32 at a desired position along cross-member 29 while stem clamp 32a grips tubular extension 31a to direct platform 31 at a desired heading.

Optionally, a smoother, more positive frictional engagement between connector element 32 and diagonal member 29 is permitted by the inclusion of a collar, force fitted or threaded into opposite ends of the cross-portion, not shown in the drawings for simplicity. The collars also are slotted to coincide with cross-portion slot 32c' for allowing the frictional gripping and releasing of the clamp.

The above disclosed framework and connector elements are fabricated from corrosion resistant or non-corrosive materials. Anodized aluminum, plastics or even suitably protected steel members are interchangeable. Preferably, the framework and connector elements are polyvinylchloride (Schedule 80 PVC), so selected because it is lightweight and non-corrosive in a marine environment. The vertical, horizontal, cross and diagonal members are force fitted, screwed, or bonded into appropriate fittings at their points of juncture to ensure structural integrity.

Using the polyvinylchloride members and the single supporting cable 12 does pose one problem. Being so constructed, the framework is relatively weightless and spins about at the end of its cable. Neither will the framework maintain a fixed position or orientation when the module is suspended in slight currents. The framework's tendency for such random motion is arrested by a pair of vertically oriented side-panels 40 and 41 which align themselves with the current flow.

A camera unit 42 is mounted on camera-and-control platform 31 including a watertight housing for the picture taking process. The housing and the camera are commercially available and have the capability for being remotely actuated to take a sequence of shots upon command. A housing which has been used with successful results is the commercially available "Ocean Eye Underwater Housing" marketed by Data Corporation, Photogrammetry Division, Rockville, Maryland housing a 35mm Nikon F motordrive camera interconnecting and actuating the housing and camera via an actuator 42a on the surface as provided for with the commercial unit, yields highly satisfactory results.

Commercially available strobe lights units 43, 44, 45 and 46 of the type marketed under the manufacturer's designation "Mark 150" by Subsea Products, Inc., of San Diego, California are strategically located on the framework to provide the desired amount of intermittent illumination for the camera. Each strobe light unit carries its own batteries and has a control line reaching to camera-and-control platform 31. At the platform, suitable circuitry 42b, see FIG. 3 is provided to simultaneously actuate the camera in synchronization with the flashing strobe light unit upon the reception of a control signal from actuator 42a over line 42c.

Strobe light units 43 and 44 are pivotally mounted on vertical members 17 and 14 via their own separate T-shaped connector element 36 and 39, respectively. Being so mounted, as disclosed above, allows pivotal motion 360° in the vertical plane and 360° in the horizontal plane. Thus, the light from these two strobe light units may be aimed in any direction.

With respect to strobe light units 45 and 46, they are either pivotally secured to vertical member 16 and vertical member 15 via T-shaped connector element 37 or T-shaped connector element 38 or, in the alternative, are mounted onto cross-member 28 via interconnecting T-shaped connector elements 34 and 35. Whether or not strobe light units 45 and 46 are carried on the vertical members or the cross member is dependent upon which mode of operation is desired, that is, which facing the camera will have during the picture taking sequence. All components, such as strobes and camera platform are simply removed for storage by loosening the stainless bands.

Looking to FIG. 2, if it were desired to take a series of pictures forward of the underwater photographic module as, for example, would be taken while the module is suspended and moved over a submerged reef, camera unit 42 and strobe light units 43 and 44 are rotated and oriented with their lenses pointing forward. Similarly, strobe light units 45 and 46 are pivotally secured in their T-shaped connector elements 34 and 35 having their faces or lenses pointing forwardly. Thus, whenever an actuator signal is generated by actuator 42a and passed to camera-and-control platform 31 via control line 42c all strobes simultaneously flash radiating a large frontal area as the camera shutter is stripped In the mode of operation depicted in FIG. 3, camera unit 42 and strobe light units 43 and 44 are rotated in their associated T-shaped connector elements 36 and 39 and secured facing downward. Light units 45 and 46 are withdrawn from the stem portions of T-shaped connector elements 34 and 35 and are inserted in the stem portions of T-shaped connector elements 37 and 38. The strobe light units are aimed downwardly and the stem clamps are tightened in place to thusly ensure the downward facing of all the light units. The area defined by members 18, 21, 25 and 24 is adequately illuminated to permit wide-angle shots by the camera. Should a wider angle downward shot or, for that matter, a forward shot be desired, a suitable lens is included in the camera unit and the direction of the four strobe lights is adjustable to cover the wider angle.

While the camera-strobe light combination disclosed above avoids the necessity of having a diver in the water during hazardous night photographic missions, more highly satisfactory results are obtained by including vertical, horizontal and focusing sensors. The camera is focused to be in-focus at a predetermined focal distance at the surface prior to deployment. An acoustic transducer 49 is taped onto the camera housing and downwardly projects ensonifying energy. Portions of the radiated energy are reflected back to the transducer which, in turn, generates a representative signal to monitoring unit 11a on the supporting vessel. At the monitoring unit, a visual indication of the distance of separation between the film plane of the camera and the bottom of the body of water or the organisms to be photographed is provided. Additional playing out or reeling in of the supporting cable is now possible to locate the module at a desired depth. Such transducers and monitoring units are in wide use today and are sold as fathometers, depth finders, etc. Although they are sold with only 25–30 feet of cable between the transducer and monitor, tests showed they still functioned adequately with nearly 500 feet of cable.

When the module is being towed through the water via the supporting cable, a forwardly looking transducer 48 is clamped or taped onto one of the structural members, in this case cross member 24, to guard against collision and damage to the module. Here again, a control lead reaches from the transducer to the camera-and-control platform and to the surface via supporting cable 12. Having the two transducers operating simultaneously gives a surface operator an immediate indication of the bottom profile and allows a sufficient maneuvering of the module to avoid damage.

One of the main uses of the invention is the taking of photographs of nocturnal marine organisms. Frequently, these organisms are quite noisy at night and their location is better determined by a hydrophone rather than by the human ear. For this reason, it has been found most expedient to include a hydrophone 47 on cross member 24 or any other convenient location. After a particular organism is located by scientists on the supporting vessel, the command for actuation of the camera and the simultaneous illumination of the area with the strobe light units is given.

The entire photography sequence is performed by scientific personnel aboard vessel 11 safely and inexpensively. The location of the marine organisms and positioning of the module are done acoustically without any light sources which may otherwise frighten the organisms away. The single flash of the strobe light units is the animal's only awareness that his photo is about to be or is being taken. He is photographed in his natural environment completely exposed.

Obviously, many modifications and variations of the present invention are possible in the light of the above teachings, and, it is therefore understood that within the scope of the disclosed inventive concept, the invention may be practiced otherwise than specifically described.

What is claimed is:

1. An underwater photographic module comprising:
   means defining a framework;
   means suspending said framework means from a surface vessel including control and data transfer cables;
   a camera mounted on the framework means having a predetermined focal length and adapted for undersea use;
   means for acoustically locating sound producing organisms to ensure the proper orientation of said camera toward the sound producing organisms via the suspending means.
   means carried on said framework means for providing an acoustic representation of the distance between said camera and said sound producing organisms to ensure the placement of said camera at said predetermined focal distance via the suspending means; and
   a plurality of strobe lights carried on said framework means for illuminating said object with a high intensity flash.

2. An underwater module according to claim 1 further including:
   means for indicating the horizontal separation between said framework means and obstacles while being towed by said surface vessel.

3. An underwater module according to claim 2 further including:
   means defining a pair of vertically extending, flat side panels mounted on opposite sides of said framework means for stabilizing the module in currents.

4. An underwater module according to claim 3 further including:
   connector elements pivotally mounting said camera and said strobe lights on said framework means for permitting the selective orientation of said camera and said strobe lights.

5. An underwater module according to claim 4 in which said framework means includes a pair of diagonal members mounting said camera for ensuring the selective positioning of said camera.

6. An underwater module according to claim 5 in which each connector element is a "T" section of piping having a cross-portion slot and carrying a releasable clamp for permitting the selective positioning of said camera and said strobe light on said framework.

* * * * *